(12) United States Patent
Anazawa et al.

(10) Patent No.: US 7,205,940 B2
(45) Date of Patent: Apr. 17, 2007

(54) ANTENNA AND COMMUNICATION DEVICE

(75) Inventors: Kazunori Anazawa, Nakai-machi (JP); Chikara Manabe, Nakai-machi (JP); Hirotsugu Kashimura, Nakai-machi (JP); Hiroyuki Watanabe, Nakai-machi (JP); Masaaki Shimizu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 98 days.

(21) Appl. No.: 10/507,910

(22) PCT Filed: Feb. 25, 2003

(86) PCT No.: PCT/JP03/02052

§ 371 (c)(1),
(2), (4) Date: Sep. 16, 2004

(87) PCT Pub. No.: WO03/083993

PCT Pub. Date: Oct. 9, 2003

(65) Prior Publication Data
US 2005/0116861 A1 Jun. 2, 2005

(30) Foreign Application Priority Data
Apr. 2, 2002 (JP) .............................. 2002-099886

(51) Int. Cl.
*H01Q 1/24* (2006.01)
*H01Q 1/38* (2006.01)

(52) U.S. Cl. ................ 343/700 MS; 343/702

(58) Field of Classification Search ......... 343/700 MS, 343/702, 872; 423/477; 524/496
See application file for complete search history.

(56) References Cited

U.S. PATENT DOCUMENTS

| | | | |
|---|---|---|---|
| 6,038,060 A * | 3/2000 | Crowley | 359/328 |
| 6,538,605 B2 * | 3/2003 | Lebaric et al. | 343/700 MS |
| 6,724,064 B2 * | 4/2004 | Watanabe et al. | 257/459 |
| 6,986,877 B2 * | 1/2006 | Takikawa et al. | 423/447.3 |
| 2003/0148097 A1 * | 8/2003 | Takikawa et al. | 428/364 |
| 2006/0028110 A1 * | 2/2006 | Takigawa et al. | 313/310 |

FOREIGN PATENT DOCUMENTS

| | | |
|---|---|---|
| JP | U 56-99906 | 8/1981 |
| JP | A 2001-250096 | 9/2001 |
| JP | A 2001-267824 | 9/2001 |
| JP | A 2001-281966 | 10/2001 |
| JP | A 2001-308635 | 11/2001 |
| JP | A 2002-7992 | 1/2002 |
| JP | A 2002-50919 | 2/2002 |
| JP | A-2002-109489 | 4/2002 |
| WO | WO 98/39250 | 9/1998 |

* cited by examiner

*Primary Examiner*—Tan Ho
(74) *Attorney, Agent, or Firm*—Oliff & Berridge, PLC

(57) ABSTRACT

An object of the present invention is to provide an antenna of small size which is excellent in the response characteristic in the high-frequency band, and to provide a communication device including the antenna having such an excellent characteristic that it is possible to realize downsizing of the device as a whole. That is, the present invention is directed to an antenna characterized by including a radiator made up of a carbon nanotube, and as a specific structure, for example, an antenna characterized by including an electrode that is connected with a part of the carbon nanotube and operates as a monopole antenna, and a communication device including the antenna.

31 Claims, 11 Drawing Sheets

ANTENNA AND COMMUNICATION DEVICE

TECHNICAL FIELD

The present invention relates to a novel antenna that enables the transmission and reception of an electromagnetic wave, and a transmitting device, a receiving device, and a transmitting/receiving device each having the antenna.

BACKGROUND ART

In recent years, 2.5 GHz in the coming generation multimedia mobile communication and 2 to 30 GHz in a wireless LAN are employed in a high-frequency band in the communication field. Also, 5.8 GHz in an ETS (electronic toll system) and 76 GHz in an AHS (advanced cruise-assist highway system) are used in a high-frequency band in an ITS (intelligent transport system). In the future, it is expected that fields in which the high-frequency band is applied are further spread rapidly.

Also, a communication terminal represented by a cellular phone has been downsized or brought into a built-in module, and the necessity of an antenna that is high in efficiency and small in size is rising in high-frequency receiving and transmitting portions adaptive to a broad band.

What are widely used as an antenna for a mobile radio device such as the cellular phone are a fixed helical antenna and a built-in type planar inverted-F antenna. In the fixed helical antenna, a fixed helical antenna element is disposed to realize an antenna system that is small in size and light in weight. Also, in the planar inverted-F antenna, radiation elements are so arranged as to be close to each other in parallel with a radio device substrate. A part of the radiation elements is grounded to an earth point, and an electricity is fed to another part of the radiation elements from an electricity feeding point, to thereby realize a short antenna and enable the design of a cellular phone in which the antenna is not projected from a cellular phone body.

However, even in both the cases of the fixed helical antenna and of the planar inverted-F antenna, the communication band of the antenna element is specified and therefore it is impossible to maintain the efficiency over plural bands. Also, in the case where the communication terminal is brought into a module, the size of the antenna portion becomes larger than the size of a circuit chip, and the downsizing of the module is restricted.

Accordingly, an object of the present invention is to provide an antenna which is excellent in the response characteristic in a high-frequency band and very small in size. Also, another object of the present invention is to provide a communication device that has a transmitting function, a receiving function, or a transmitting/receiving function, which includes an antenna that is excellent in the response characteristic in the high-frequency band and very small in size, and which can realize the downsizing of the overall device.

DISCLOSURE OF THE INVENTION

The prevent inventors have found out that the above objects could be achieved by using a carbon nanotube that is excellent in a response characteristic in a high-frequency band as a primary structural element of an antenna, and have attained at the present invention.

That is, the present invention is directed to an antenna characterized by including a radiator made up of a carbon nanotube, and as a specific structure, for example, an antenna characterized by including an electrode that is connected with a part of the carbon nanotube and is for operating the antenna as a monopole antenna. The "monopole antenna" is directed to an antenna that has an electricity feeding portion (an antenna that is provided with an electrode) on an end portion of the radiator, whereas the "bipolar antenna" is directed to an antenna having an electricity feeding portion in the center of the radiator.

A carbon structure represented by the carbon nanotube is broad in the absorption wavelength band of an electromagnetic wave because of its electron structure, and the electron structure of the carbon nanotube approaches one dimension. Therefore, it is presumed that the carrier transmission speed of the carbon structure is extremely high. As its proof, it is found that in the carbon nanotube, a current-to-voltage characteristic does not comply with the Ohm's law, but exhibits a conduction mechanism called "ballistic conduction". In the ballistic conduction, because a carrier such as an electron or a hole is merely elastically scattered, the electric resistance is extremely low, and the carrier transport can be realized at a high current density of $10^9$ A/m$^2$ or more. The present inventors have found out from the above phenomenon that the carbon nanotube responds in the broad high-frequency band, and have arrived at the present invention.

The antenna having the carbon nanotube as the primary structural element in accordance with the present invention, as described above, not only exhibits absorption in the broad high-frequency band, but also can transmit the absorbed high-frequency as a current at a high speed and with a high efficiency because of the electric characteristic of the carbon nanotube. Therefore the practicality is remarkably high as an antenna used for transmission and/or reception of the high-frequency band. In the present invention, the "high frequency" generally corresponds to a frequency having a concept as the high frequency, and more particularly is mainly directed to a frequency band of from 100 MHz to 1 THz.

An antenna is usually so structured as to have the directivity in order to efficiently transmit or receive an electromagnetic wave that is propagated from one way or to one way by setting an element length of a radiation portion (also called "radiator" or "electricity feeding portion", in both case of transmission and reception), which is connected to an antenna line, to the length of about a fractional ratio of the wavelength (for example, λ/4, 3/8λ, λ/2, 5/8λ, etc.).

However, the antenna according to the present invention has an extremely high electric conductivity as compared with a conventional antenna material because the radiator is made up of the carbon nanotube, and has the high conversion efficiency of the electromagnetic wave because the antenna remarkably absorbs a high-frequency signal. On the other hand, because the carbon nanotube per se is very small in size as compared with the wavelength of the electromagnetic wave, the directivity of the electromagnetic wave in the propagating direction is low, and the sensitivity is high with respect to all directions as compared with the conventional material.

Accordingly, it is presumed that even if the directivity is not enhanced as in the antenna made of the conventional antenna material, a relatively excellent sensitivity (the electromagnetic wave conversion output of the degree that can be replaced by the antenna element of the conventional size) can be provided.

Also, since the carbon nanotube that is the primary structural elements is microscopic, the antenna according to the present invention is astronomically small-sized as compared with the antennas of various types which have been used as the antenna of the communication device (transmitting device, receiving device, or transmitting/receiving device) up to now, thereby being capable of manufacturing a remarkably small-sized communication device.

In addition, according to the present invention, since the carbon nanotube, which serves as an outlet/inlet for transmitting a high frequency to the air and/or receiving the high frequency from the air, is remarkably short to the degree of about several hundreds µm at the longest, the antenna according to the present invention as described above has substantially no directivity and is extremely preferable as the antenna of the communicating device that is generally desired to be non-directive.

A structure of the antenna according to the present invention is, for example, that one end portion or its periphery of the carbon nanotube that serves as the radiator is connected to an electrode, and there may be provided plural carbon nanotubes that are connected to the electrode. Also, at least a part of the carbon nanotube which is not connected to the electrode may be fixed to another member (for example, another electrode). In this case, when plural carbon nanotubes are provided, it is sufficient that a gap between the electrode and another member is bridged by at least a part of the plural carbon nanotubes, and bridging may not be made by all of the carbon nanotubes.

It is preferable that the carbon nanotube is a multi-wall carbon nanotube. When the radiating portion of the antenna is structured by the multi-wall carbon nanotube, it becomes easy to handle, and the manufacture efficiency is improved. In addition, because the respective layers function as parallel electric transmission paths, the conversion efficiency of the electromagnetic wave is improved, and the receiving sensitivity as the antenna is improved.

It is preferable that the diameter of the carbon nanotube is set to 0.3 nm to 100 nm, and the length of the carbon nanotube is set to 0.1 µm to 100 µm.

Further, it is preferable that the electrode contains any one of materials selected from the group consisting of Au, Pt, Ag, Cu, Ta, Nb and Ti.

It is preferable that the connection resistance between the carbon nanotube and the electrode connected with the carbon nanotube is set to 10 MΩ or lower.

The electrode is generally disposed on the surface of the substrate. It is preferable that a dielectric layer is formed on the uppermost surface of the substrate on which the electrode is disposed. Further, it is preferable that the thickness of the dielectric layer is set to 1 nm to 10 mm. It is preferable that the resistivity of the surface of the substrate on which the electrode is disposed to $1\times10^6$ Ωcm or more.

It is preferable that at least a part of the carbon nanotube is covered with a protective layer. It is preferable that the protective layer is a dielectric.

As the antenna of the present invention, a range of from 500 MHz to 1 THz can be preferably set to the transmission band and/or reception band.

The antenna of the present invention functions as a transmission antenna, a reception antenna, or a transmission and reception antenna.

On the other hand, the communication device of the present invention is directed to a communication device having a transmitting function (hereinafter, also called "transmitting device") characterized by including the antenna of the present invention, a communication device having a receiving function (hereinafter also called "receiving device"), and a communication device having a transmitting/receiving function (hereinafter, also called "transmitting/receiving device").

The following examples are given as a transmitting/receiving device of the present invention.

1. The transmitting/receiving device, characterized by including a receiving circuit, a transmitting circuit, and a duplexer that changes over a circuit to be connected with the electrode of the antenna of the present invention between the receiving circuit and the transmitting circuit.

2. A transmitting/receiving device characterized by including a transmitting circuit, an antenna of the present invention which is connected to the transmitting circuit, a receiving circuit, and an antenna of the present invention which is connected to the receiving circuit.

BEST MODE FOR CARRYING OUT THE INVENTION

Hereinafter, a description will be given in more detail of preferred embodiments of the present invention.

(Summary of the Invention)

FIGS. 1 are schematic perspective views showing three modes of an antenna according to the present invention, respectively, by using an example in which only one carbon nanotube is used.

Figure 1A:
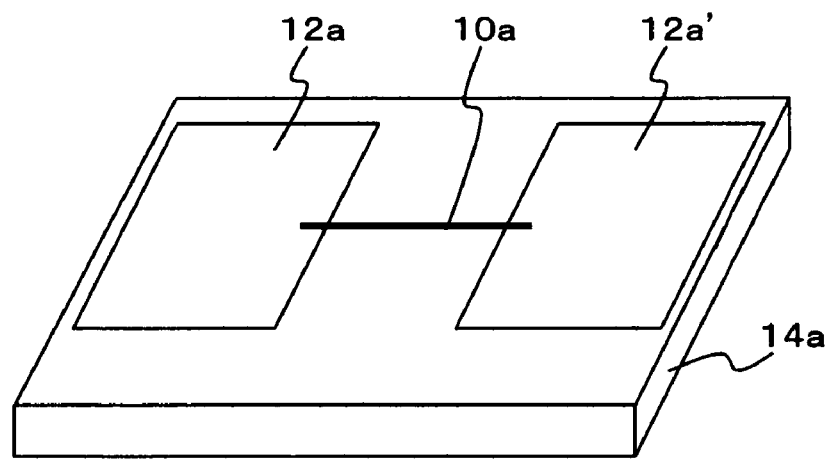
FIGS. 1 are schematic perspective views showing three modes of an antenna according to the present invention, respectively, by using an example in which one carbon nanotube is used.

In FIG. 1(a), a pair of electrodes 12a and 12a' are disposed on a surface of a substrate 14a, and a carbon nanotube 10a is so disposed as to have its end portions or their periphery connected to both of the electrodes 12a and 12a' and to bridge a gap between the electrodes 12a and 12a'.

Figure 1B:
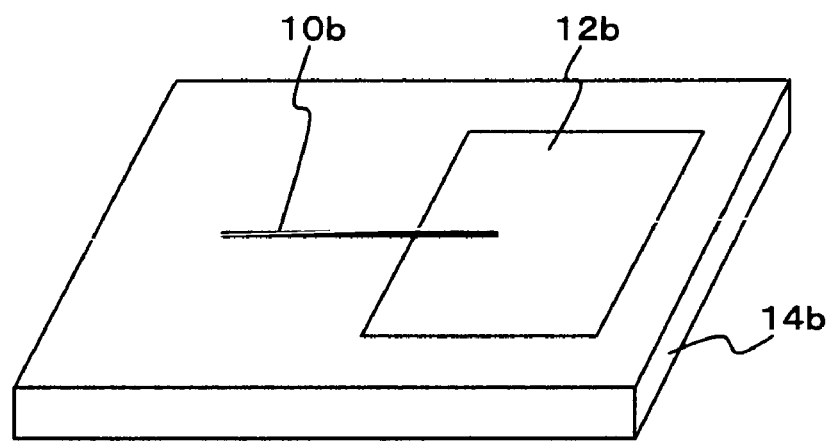

In FIG. 1(b), an electrode 12b is disposed on a surface of a substrate 14b, and a carbon nanotube 10b is so disposed as to have its one end portion or its periphery connected to the electrode 12b and to project the other end portion of the carbon nanotube 10b from an edge of the electrode 12b by about ⅔ exceeding the center portion of the carbon nanotube 10b in the longitudinal direction.

Figure 1C:
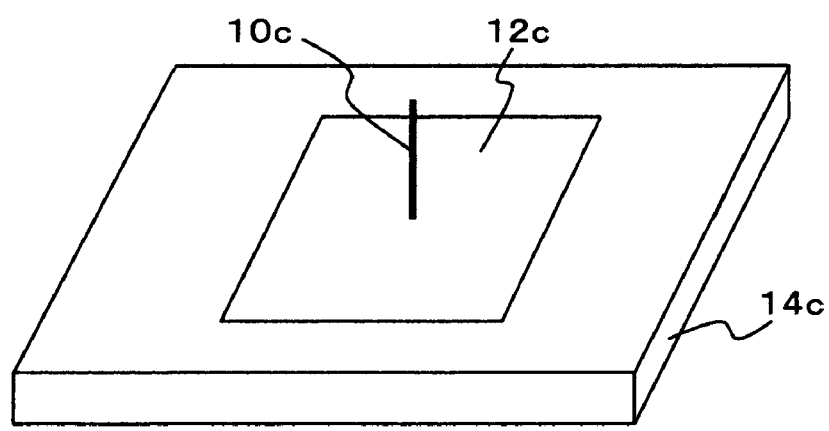

In FIG. 1(c), an electrode 12c is disposed on a surface of a substrate 14c, and a carbon nanotube 10c is so disposed as to project vertically from the substantial center of the electrode 12c and to have one end portion thereof connected to the electrode 12c. The present invention may be applied to any of the above cases.

It is preferable that each of the carbon nanotubes 10a, 10b and 10c is covered with a protective layer formed for the purpose of intercepting the carbon nanotube from the air and/or for the purpose of physically protecting the carbon nanotube.

Hereinafter, the respective structural elements of the present invention will be described.

(Carbon Nanotube)

In general, the "carbon nanotube" is directed to a graphen sheet of hexangular net of carbon forming a tube in parallel with the axis of the tube. The carbon nanotube is further classified into a single-wall carbon nanotube having a single-graphen structure, and a multi-wall carbon nanotube having a multi-graphen structure. Which structure of the carbon nanotube can be obtained is determined to a certain extent depending on a composing method or condition.

In the present invention, the carbon nanotube which is the primary structural element may be the single-wall carbon nanotube or the multi-wall carbon nanotube, but preferably the multi-wall carbon nanotube. When the radiating portion of the antenna is formed of the multi-wall carbon nanotube, it becomes easy to handle, and the manufacture efficiency is improved. In addition, because the respective walls function as the parallel electric transmission paths, the conversion efficiency of the electromagnetic wave is improved, and the receiving sensitivity as the antenna is improved.

Also, a variety of carbon nanotubes such as a carbon nanohorn (a horn type that continuously expands the diameter from one end portion toward the other end portion), a carbon nanocoil (a coil type that is spirally shaped as a whole), carbon nanobeads (a shape in which a tube is provide in the center and penetrates through a spherical bead made of amorphous carbon or the like), a cap stack type nanotube, a carbon nanotube whose outer periphery is covered with the carbon nanohorn or the amorphous carbon can be also used as the carbon nanotube in the present invention even though they are not strictly tube-shaped.

In addition, a carbon nanotube containing some material therein, such as a metal contained nanotube in which metal or the like is contained in the carbon nanotube, or a peapod nanotube containing fullerene or a metal contained fullerene therein can be also used as the carbon nanotube in the present invention.

As described above, in the present invention, in addition to the normal carbon nanotubes, the carbon nanotubes of any figures such as their variety or the carbon nanotubes that are variously modified can be also used without any problems from the viewpoints of their electric characteristics and high-frequency characteristics. Therefore, the "carbon nanotube" in the present invention includes all of those modifications as its concept.

The composition of those carbon nanotubes can be conducted by the conventionally well known methods such as the arc electric discharge method, laser abrasion method, and CVD method, and any of the above methods can be used in the present invention. Among them, the arc electric discharge method in the magnetic field is preferable from the viewpoint that a high-purity carbon nanotube can be composed.

It is preferable that the diameter of the carbon nanotube as used is set to 0.3 nm to 100 nm. When the diameter of the carbon nanotube exceeds the above range, the composition becomes difficult, and it is not preferable from the viewpoint of the costs. The more preferable upper limit of the diameter of the carbon nanotube is 30 nm or less.

On the other hand, the lower limit of the diameter of the carbon nanotube is generally set to about 0.3 nm from the structural viewpoint. However, because the carbon nanotube that is extremely thin is not preferable from the viewpoint that the yield at the time of composition becomes low, it is more preferable that the lower limit is set to 1 nm or more, and it is most preferable that the lower limit is set to 10 nm or more.

It is preferable that the length of the carbon nanotube as used is set to 0.1 μm to 100 μm. When the length of the carbon nanotube exceeds the above range, composition becomes difficult or a specific process is required for composition, and it is not preferable from the viewpoint of the costs. When the length of the carbon nanotube is lower than the above range, it is not preferable because it is difficult to connect the carbon nanotube to the electrode. It is more preferable that the upper limit of the length of the carbon nanotube is set to 10 μm or less, and that the lower limit of the length of the carbon nanotube is set to 1 μm or more.

The number of carbon nanotubes that are connected to the electrode is one in the examples of FIGS. 1, and the antenna functions effectively with one carbon nanotube, but plural carbon nanotubes may also be applied. In order to enhance the receiving performance and the transmitting performance as the antenna, it is preferable that the number of carbon nanotubes is larger. The number of carbon nanotubes may be appropriately selected while taking into consideration the downsizing or the manufacture costs of the antenna, and of the communication device.

(Electrode)

An electrode that is one of the essential structural elements of the present invention may be formed of a pair of electrodes as indicated by 12a and 12a' in FIG. 1(a), or may be formed of one electrode as indicated by 12b or 12c in FIGS. 1(b) or 1(c), as described above.

In the present invention, the electrode is not limited if the electrode has the conductivity, and the conventional materials can be employed without any problem, and it is preferable that the electrode includes any one of materials selected from the group consisting of Au, Pt, Ag, Cu, Ta, Nb and Ti. Each of those materials may be used by itself, but an alloy consisting of two or more of those materials, or an alloy consisting one or more of those materials and another metal may be preferably used. Those materials are excellent in the conductivity and high in the machining property and the stability, and are used as the electrode of the electronic device up to now.

In the present invention, when the electrode per se has the hardness to a certain extent and has the configuration retaining property, structure may be made by only the electrode, but in general, the electrode is disposed on a surface of an appropriate substrate as shown in FIGS. 1.

As shown in FIG. 1(a), in the case where a pair of electrodes 12a and 12a' are disposed on the surface of the substrate 14a, it is preferable that a gap between those electrodes (inter-electrode distance) is set to 10 nm to 100 μm, and it is more preferable that the gap is set to 50 nm to 10 μm. When the inter-electrode distance is too long, it is difficult to obtain a carbon nanotube that has a length sufficient to bridge the gap between the electrodes. Therefore, too long inter-electrode distance is not preferable. On the other hand, when the inter-electrode distance is too short, there is a case in which both of the electrodes are rendered substantially conductive, and the manufacturing of the electrodes becomes extremely difficult. Thus, the short inter-electrode distance is not preferable from the viewpoint of the costs.

In the present invention, the thickness of the electrode is not particularly limited. However, in the case where the electrode is disposed on the surface of the substrate as in the modes shown in FIGS. 1, the thickness is appropriately set to a range of from 10 nm to 100 μm, and more preferably set to a range of from 50 nm to 1 μm.

In the present invention, it is not required that the electrode is distinctly formed as the electrode as shown in FIGS. 1. For example, it is possible that a print wiring on a printed board of the communication device is used as the electrode and connected with the carbon nanotube. Also, the carbon nanotube is connected to any member such as a lead wire or a frame, and those members may be used as the electrode.

(Relationship Between Carbon Nanotube and Electrode)

In the present invention, one end portion or its periphery of the carbon nanotube is connected to the electrode. Also, as shown in FIG. 1(a), the other end portion may be connected to another electrode.

In the present specification, the "one end or its periphery of the carbon nanotube" means any halfway portion of the carbon nanotube in the longitudinal direction from one end portion thereof, and "connected" means that at least a part thereof is connected, and it is unnecessary that all portions thereof are connected. Also, in the present specification, "connect" means electric connection, and physical connection is not always required.

The same as that described above is applied to the structure in which the other end portion is connected to another electrode (for example, the structure shown in FIG. 1(a)).

A range of the positions of "the halfway portion of the carbon nanotube in the longitudinal direction" is not particularly limited. For example, even if most portions of the carbon nanotube in the longitudinal direction are connected to the electrode (that is, even if the position of "the halfway portion" is closer to the other end portion than to the one end to which the carbon nanotube is connected), or even if a portion of the carbon nanotube which is projected from the edge of the electrode is slight or if there is no portion of the carbon nanotube which is projected from the edge of the electrode, the present invention can be applied. However, in the case where the entire carbon nanotube is hidden in the electrode, the electromagnetic wave may be blocked. Therefore, it is preferable that the carbon nanotube is projected from the electrode.

It is preferable that a connection resistance between the carbon nanotube and the electrode connected with the carbon nanotube is set to 10 MΩ or less, and it is more preferable that the connection resistance is set to 1 MΩ or less. The excessively large connection resistance is not preferable because the conductivity becomes insufficient, and the carbon nanotube does not function as the antenna. Because the smaller connection resistance is more preferable, the appropriate lower limit does not exist. However, in the case of the carbon nanotube and the electrode, the lower limit is generally about 10 kΩ.

It is preferable that an angle defined between the carbon nanotube and the electrode connected with the carbon nanotube is set to 10° or more. The angle is more preferably set to 30° or more, still more preferably set to 45° or more, and most preferably set to the vertical. It is preferable that the angle is close to the vertical in the case where the carbon nanotube is disposed between two electrodes, because the carbon nanotube bridges the shortest distance between those two electrodes, and the length of the carbon nanotube can be shortened.

In the present specification, the "angle" means an angle defined between the carbon nanotube and the electrode at a portion where the carbon nanotube and the electrode are connected to each other.

The angle will be described assuming that a linear carbon nanotube and a plane electrode are disposed. In the case where one end portion of the carbon nanotube is abutted against the plane of the electrode, and the carbon nanotube is disposed in a direction normal to the plane of the electrode or with a given angle with respect to the normal direction, the above angle means the smallest angle formed between the plane of the electrode and the carbon nanotube. In FIG. 1(c), because the carbon nanotube 10c is disposed in the normal direction of the electrode 12c, the angle is 90° (vertical)

Also, in the case where a portion of the carbon nanotube extending from an end portion thereof to the halfway portion in the longitudinal direction is linearly abutted against the plane of the electrode and projected from the edge of the electrode, the above angle means the smallest angle formed between the edge of the electrode and the carbon nanotube. In FIG. 1(b), because the carbon nanotube 10b is projected vertically from the edge of the electrode 12b, the angle is 90° (vertical). The angle formed between the electrode 12a or the electrode 12a' and the carbon nanotube 10a in FIG. 1(a) is also 90° (vertical).

In the case where the carbon nanotube is curved, or in the case where a non-linear carbon nanotube such as the carbon nanobeads is employed, for example, it is difficult to obtain the angle in accordance with a distinct linear mutual relationship. In such cases, the above angle is obtained by drawing a tangent as required on a boundary between the abutting portion and the non-abutting portion of the carbon nanotube with the electrode.

In the connection of the carbon nanotube with the electrode, when the carbon nanotube and the electrode are linearly abutted against each other as shown in FIG. 1(b), an adhesion of some extent can be expected even if the carbon nanotube and the electrode are not particularly fixed to each other. In the case where the firm connection is conducted, in the case where the abutting portion of the carbon nanotube and the electrode is short as shown in FIG. 1(a), or in the case where the carbon nanotube and the electrode are in point contact with each other as shown in FIG. 1(c), it is desirable to fix those members by some method. As a specific fixing method, although it is not particularly limited, there is, for example, a method in which an electron ray is irradiated onto a portion to be fixed, to thereby deposit amorphous carbon on the irradiated portion and fix the electrode and the carbon nanotube. Also, there is a method in which the carbon nanotube and the electrode are fixed together during the manufacture of the carbon nanotube. Specifically, there is a method in which, during the manufacture of the carbon nanotube, the carbon nanotube is made to grow directly on the electrode that also serves as a catalyst, or a catalyst metal is fixed on the electrode and the carbon nanotube is made to grow on the electrode.

(Substrate)

In the present invention, as the substrate on which the electrode is formed as required, although not particularly limited, it is required that at least the surface of the substrate on which the electrode is disposed is of insulation. The specific resistivity of the surface is preferably set to $1 \times 10^6$ $\Omega$cm or more, and more preferably set to $5 \times 10^6$ $\chi$cm or more. In the case where the resistivity of the surface is lower than $1 \times 10^6$ $\Omega$cm, the resistivity approaches substantially conductivity. This is not preferable because, for example, in the case of FIG. 1(a), insulation between the electrodes 12a and 12a' cannot be ensured, and in the case of FIG. 1(b), the angle formed between the carbon nanotube 10b and the electrode 12b becomes substantially 0°. On the other hand, although the upper limit of the resistivity of the surface is not limited, the upper limit is generally about $1 \times 10^{12}$ $\Omega$cm.

Figure 2:
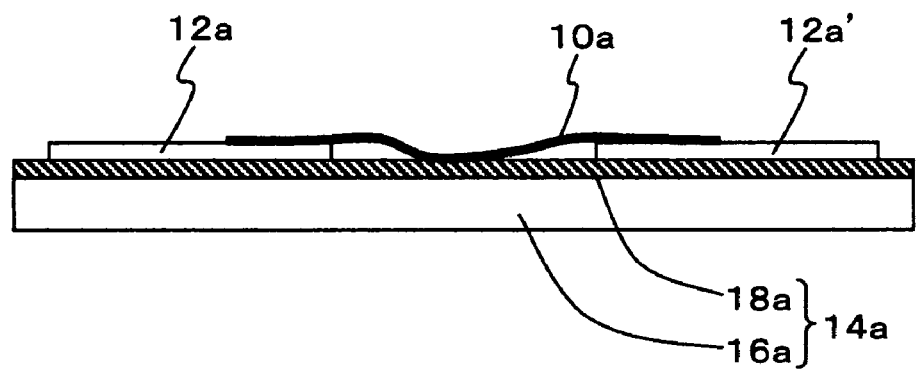
FIG. 2 is a cross-sectional view of the antenna shown in FIG. 1(a), which draws the antenna more approximate to the original antenna than that shown in FIG. 1(a)

The structure of a preferred substrate will be described with reference to the antenna structured as shown in FIG. 1(a). FIG. 2 is a cross-sectional view of the antenna shown in FIG. 1(a), which draws the antenna more approximate to the original antenna than that shown in FIG. 1(a). In FIG. 2, a substrate 14a is structured in such a manner that a dielectric layer 18 is formed on a surface of a support plate 16 on the side where the electrodes 12a and 12a' are disposed.

The support plate 16 is formed of an Si substrate in this example. However, the present invention is not limited to this structure. The thickness of the support plate is appropriately adjusted depending on a material to be used so as to provide a sufficient configuration retaining property, and is normally appropriately selected from the same range as that of the normal electric wiring substrate.

The material of the dielectric layer 18 is SiO$_2$ in this example. However, the present invention is not limited to this. As the material of the dielectric layer 18, it is sufficient to use materials by which a thin film of dielectric is formed, and which is liable to ensure the adhesion with the electrodes 12a, 12a', and the support plate 16. Examples of such materials are silicon oxide, silicon nitride, lithium niobate, strontium titanate, or diamond.

With the above formation of the dielectric layer 18 on the uppermost surface of the substrate 14a, the electric insulativity can be given to the substrate.

The thickness of the dielectric layer is preferably set to 1 nm to 10 mm, and more preferably set to 10 nm to 1 mm. When the thickness of the dielectric layer is lower than 1 nm, there is a fear that the electric insulativity is destroyed, and when the thickness of the dielectric layer exceeds 10 mm, it is difficult to realize the downsized device. Thus, both of those cases are not preferable.

The various wiring boards disposed within the communication device can serve as a substrate on which the electrode of the antenna of the present invention is formed. In this case, it is preferable that the resistivity of the surface is within the above-mentioned range, and it is also preferable that the above-mentioned dielectric layer is formed on the uppermost layer.

(Protective Layer)

Figure 3:
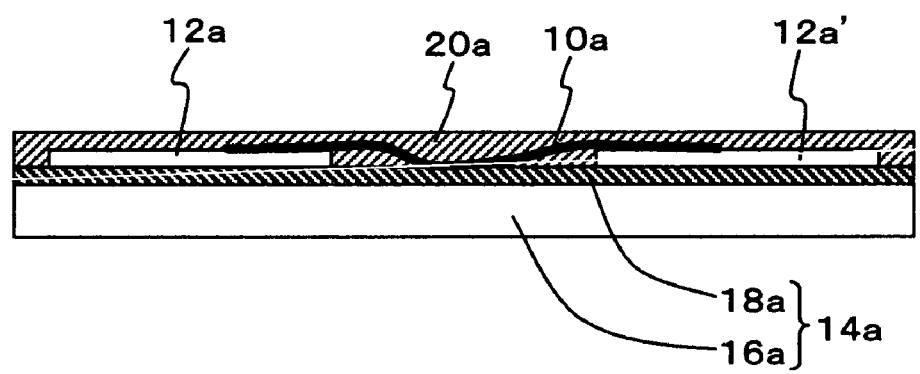
FIG. 3 is a cross-sectional view showing a state in which a protective layer is formed on the antenna shown in FIGS. 1(a) and 2.

It is desirable that at least a part of the carbon nanotube is covered with the protective layer. FIG. 3 is a cross-sectional view showing a state in which the protective layer is formed on the antenna shown in FIGS. 1(a) and 2 in accordance with the present invention. In FIG. 3, the protective layer 20a is so formed as to cover the entire electrodes 12a and 12a' and carbon nanotube 10a.

The protection layer 20a may be an electric conductor. However, preferably, it is a dielectric. Examples of the dielectric, which is preferred as a protection layer from the viewpoint of air-blocking function or mechanical-protection function, include inorganic compounds such as silicon oxide, silicon nitride, silicon oxynitride, titanium oxide, niobium oxide, lithium niobate, strontium titanate, and diamond; and various resins such as polyethylene, polypropyrene, polyvinyl chloride, polyvinylidene chloride, an acrylic resin, a polycarbonate resin, a fluorine resin, an amide resin, polyethylene terephthalate, polyurethane, and polystyrene.

It is preferable that the protective layer is so formed as to cover the entire electrodes 12a and 12a' and carbon nanotube 10a as in a protective layer 20a shown in FIG. 3. However, it is sufficient that at least a part of the carbon nanotube is covered with the protective layer. As long as part of the carbon nanotube is covered, it can be expected that the covered portion is blocked from the air or mechanically protected. The blocking from the air is not required to be perfectly hermetically sealing. However, the completely hermetically sealing is preferable, of course.

Figure 4:
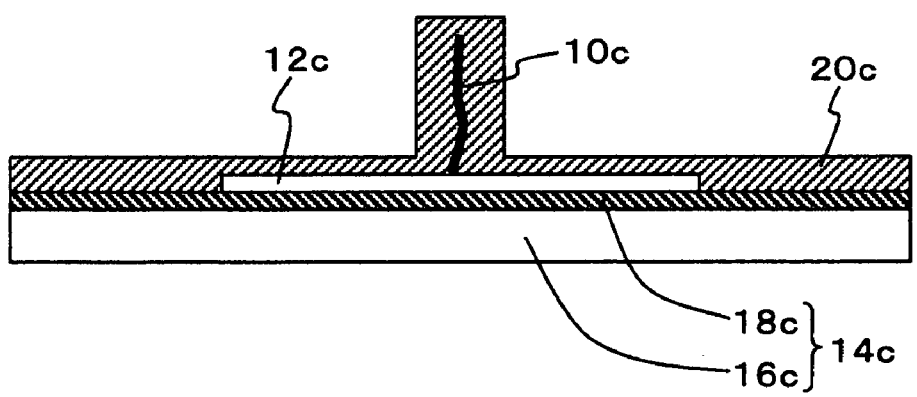
FIG. 4 is a cross-sectional view showing a state in which a protective layer is formed on the antenna shown in FIG. 1(c)

FIG. 4 is a cross-sectional view showing a state in which the protective layer is formed on the antenna shown in FIG. 1(c) in accordance with the present invention. In FIG. 4, a protective layer 20c is so formed as to cover the entire electrode 12c and carbon nanotube 10c. In the antenna shown in FIG. 1(c), it is relatively difficult to securely fix the carbon nanotube 10c and the electrode 12c, and there is a risk in that the carbon nanotube 10c is liable to drop off by means of an external force. However, the risk can be significantly reduced by covering the entire carbon nanotube 10c with the protective layer 20c.

In the antenna having no substrate according to an example of the present invention, in order to provide the protective layer, it is preferable to form the protective layer so as to cover the entire carbon nanotube from the connection portion of the electrode and the carbon nanotube, and it is more preferable that the protective layer is so formed as to cover the entire electrode in addition to the carbon nanotube.

The thickness of the protective layer is preferably set to a range of from 100 nm to 0.1 mm generally, although the thickness is different depending on the material of the protective layer to be selected.

(Fabrication of the Antenna According to the Present Invention)

The above-mentioned method of fabricating the antennas of various structures in accordance with the present invention is not particularly limited. Specific examples in which the electrode and the carbon nanotube are disposed on the substrate surface will be described below. However, the present invention is not limited to those examples.

A mask deposition method is simple and convenient as a method of forming the electrode on the surface of the substrate. However, it is desirable to use an electron beam lithography method when the electrode is formed with a higher precision, and especially when a pair of electrodes are formed and a gap between both of those electrodes should be more narrowed.

In order to arrange the carbon nanotube that functions as the antenna on one electrode or between a pair of electrodes thus formed, there is a method in which the carbon nanotube is disposed directly by using a manipulator while seeing it under a microscope such as a scanning electron microscope (SEM). There is also a method in which the carbon nanotube is dispersed in an appropriate dispersion medium such as isopropyl alcohol or dimethylformamide, and the dispersion solution is dropped on one electrode or the edge thereof, or between a pair of electrodes and dried. In particular, in the case where the carbon nanotube is to be highly oriented between a pair of electrodes, there is a method in which after the dispersion solution is dropped between the electrodes, an electric field is applied between the electrodes to align the carbon nanotube.

(Application of the Antenna of this Invention)

According to the present invention, a microscopic antenna can be fabricated by just arranging the electrode and the carbon nanotube on the circuit, and the antenna part as well as the communication device such as a mobile portable terminal can be significantly downsized.

The antenna according to the present invention can set a broad band including an extremely high frequency of from 500 MHz to 1 THz to the transmission band and/or the reception band. In the antenna according to the present invention, it is particularly preferable that particularly a band of from 800 MHz to 100 GHz is set to the transmission band and/or the reception band.

The communication device according to the present invention is directed to the transmitting device, the receiving device and the transmitting/receiving device characterized by including the antenna of the present invention which has the above-described excellent characteristics.

In the transmitting device according to the present invention, the electrode in the antenna of the present invention is connected to the transmission circuit, and a transmission signal is transmitted to the carbon nanotube from the transmission circuit and released into the atmosphere as the electromagnetic wave (high frequency) In the case where a pair of electrodes (two electrodes) are disposed in the antenna of the present invention, the transmission circuit may be connected with only one electrode or may be connected with both of the electrodes. The same is applied to a receiving circuit in the receiving device, a duplexer or a transmitting circuit and a receiving circuit in the transmitting/receiving device as described below.

Specific transmitting devices may be a communicator, a radio microphone, a radio camera or the like.

In the receiving device according to the present invention, the electrode in the antenna of the present invention is connected to the receiving circuit, and a high frequency absorbed in the carbon nanotube from the atmosphere is transmitted as the reception signal to the receiving circuit through the electrode.

Specific receiving devices may be a television, a radio, a radio clock, a GPS terminal represented by a car navigation system, a radio speaker, or the like.

On the contrary, the transmitting/receiving device includes the receiving circuit and the transmitting circuit, and the antenna is connected with the receiving circuit and the transmitting circuit. In the structure, in order to transmit the reception signal received by the antenna to the receiving device, and transmit the transmission signal from the transmitting circuit to the antenna, the transmitting/receiving device is generally equipped with a duplexer that automatically changes over the connection with the receiving device and the transmitting device. The transmitting/receiving device according to one embodiment of the present invention may include the duplexer. That is, the transmitting/receiving device according to one embodiment of the present invention includes the receiving circuit, the transmitting circuit, and the duplexer that changes over a circuit to be connected with the electrode of the antenna between the receiving circuit and the transmitting circuit.

Figure 5:
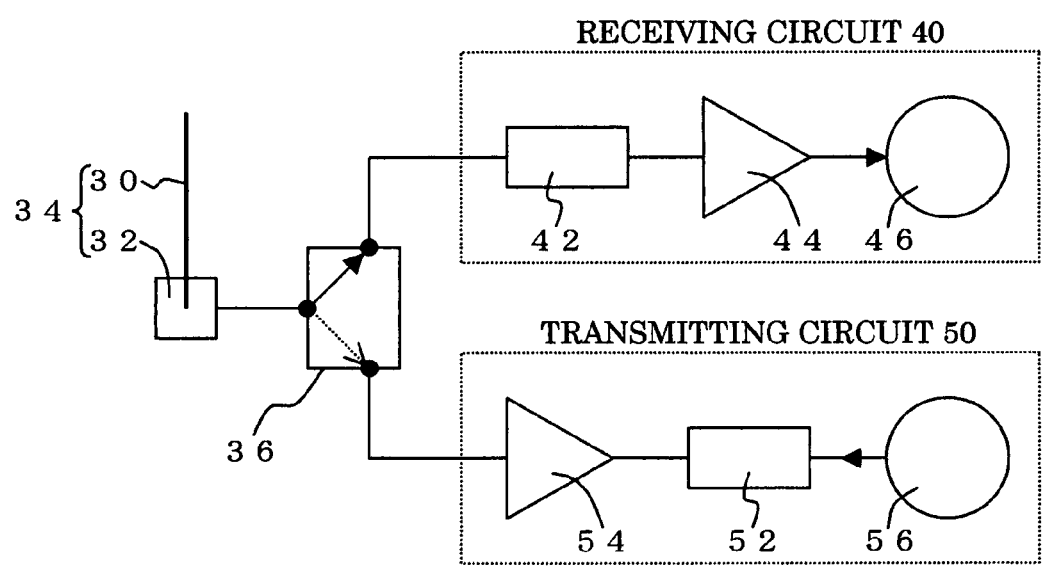
FIG. 5 is a circuit diagram showing one example of the communication device having a transmitting/receiving function in accordance with the present invention.

FIG. 5 shows a circuit diagram of an example of the transmitting/receiving device in accordance with this embodiment. In FIG. 5, reference numeral 34 denotes an antenna of the present invention which includes a carbon nanotube 30 and an electrode 32, and the electrode 32 is connected with a duplexer 36. The duplexer 36 has a function of changing over a circuit to be connected with the electrode 32 between the receiving circuit 40 and the transmitting circuit 50.

An electromagnetic wave (high frequency) absorbed by the antenna 34 is sorted into the receiving circuit 40 as an electric signal by the duplexer 36. In the receiving circuit 40, after only a necessary frequency is extracted by a surface acoustic wave filter (SAW) 42 and amplified by an amplifier 44, the frequency is processed into a desired source such as a sound or an image and then outputted.

On the other hand, in the case where the transmission signal is sent from the transmitting circuit 50, the connection with the antenna 34 changes over from the receiving circuit 40 to the transmitting circuit 50 by the duplexer 36, and the transmission signal is released into the atmosphere as an electromagnetic wave (high frequency) by the antenna 34. In the transmitting circuit 50, information inputted to an input section 56 is transmitted to a surface acoustic wave filter 52 as an electric signal, only a high frequency necessary for transmission is extracted in the surface acoustic wave filer 52, amplified by an amplifier 54, and thereafter transmitted to the antenna 34 through the duplexer 36 as the transmission signal.

The above description is given of an example of the transmitting/receiving device in which the duplexer is provided. Since the antenna according to the present invention is broad in the available frequency band, even if frequencies remarkably different between the transmission signal and the reception signal are adopted, the frequencies can be sufficiently dealt with by one antenna.

Incidentally, since the antenna according to the present invention is microscopic, one antenna is not so structured as to conduct both transmission and reception, but different antennas may be provided for the transmitting circuit and the receiving circuit. That is, the transmitting/receiving device according to another embodiment of the present invention includes the transmitting circuit, the antenna of the present invention which is connected to the transmitting circuit, the receiving circuit, and the antenna of the present invention which is connected to the receiving circuit.

Figure 6:
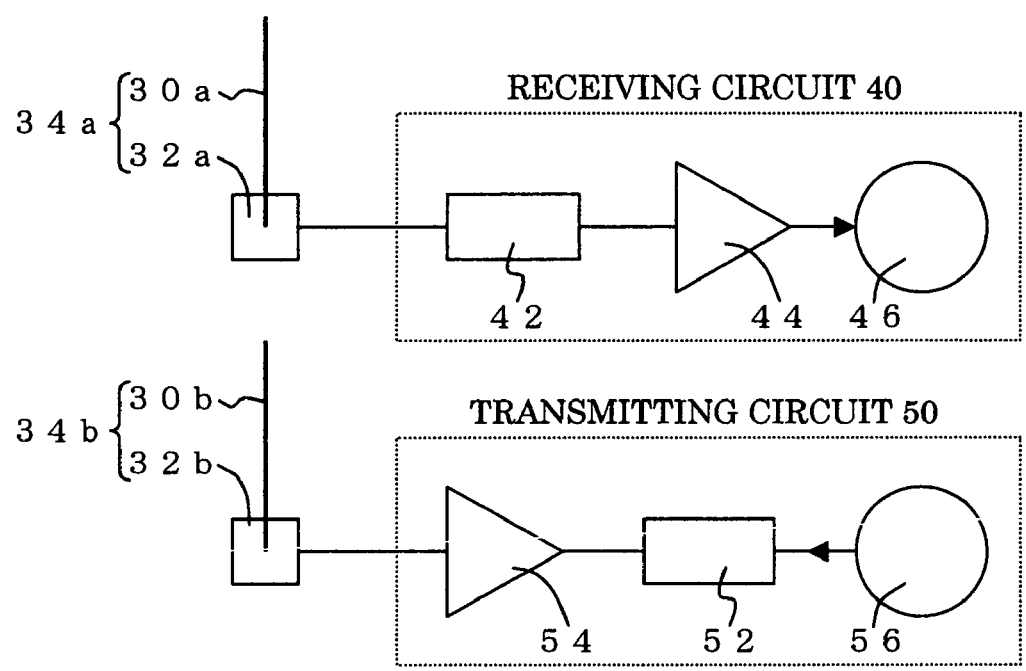
FIG. 6 is a circuit diagram showing another example of the communication device having a transmitting/receiving function in accordance with the present invention.

FIG. 6 is a circuit diagram showing an example of the transmitting/receiving device in accordance with this embodiment of the present invention. As shown in FIG. 6, the receiving circuit 40 is connected with a reception-only antenna 34*a* of the present invention which is made up of a carbon nanotube 30*a* and an electrode 32*a,* and the transmitting circuit 50 is connected with a transmission-only antenna 34*b* of the present invention which is made up of a carbon nanotube 30*b* and an electrode 32*b*. The structures of the receiving circuit 40 and the transmitting circuit 50 are identical with those in FIG. 5, and therefore the description thereof will be omitted.

In the transmitting/receiving device according to this embodiment, because it is not necessary to use the duplexer, the circuit structure becomes simple, and therefore the manufacture costs can be reduced. Also, because the antenna of the present invention is microscopic, even if dedicated antennas are provided for each of transmission and reception, independently, the transmitting/receiving device is still small in size as a whole. Thus, the provision of dedicated antennas does not obstruct the downsizing of transmitting/receiving device. In addition, the conditions such as the configuration of the antenna, the number of carbon nanotubes, and the angle formed between the carbon nanotube and the electrode can be adapted to the respective functions of transmission and reception. Therefore the performance of the overall transmitting/receiving device can be improved.

Specific transmitting devices may be a cellular phone, a PHS, a base phone and a cordless handset of a cordless telephone, a radio transceiver, or the like.

MORE SPECIFIC EXAMPLES

Next, the present invention will be explained in more detail by giving examples. However, the present invention will not be limited by the following examples.

First Example (Fabrication of Antenna)

First, a pair of electrodes for connecting a multi-wall carbon nanotube were formed on an $SiO_2$ layer side surface of an $SiO_2$/Si substrate (the thickness of an Si substrate as a support plate was 500 μm, and the thickness of an $SiO_2$ layer as a dielectric layer was 500 nm) so as to adjust a gap between those two electrodes to 2.5 μm. A mask deposition method was used as the forming method, and an electrode material as used was Au/Cr. The thickness of the electrodes was set to 50 nm.

One multi-wall carbon nanotube (40 nm in diameter and 4 μm in length) fabricated through the in-magnetic-field arc electric discharge process was so arranged as to bridge the gap between the pair of electrodes thus obtained, and fixed. More specifically, a micromanipulator was introduced in an scanning electron microscope (SEM). The detailed procedure will be described below.

First, a cathode deposit containing a high-purity multi-wall carbon nanotube that had been composed through the in-magnetic-field arc electric discharge process, and the above-mentioned $SiO_2$/Si substrate on which the Au/Cr electrode was formed were inserted into the SEM. One carbon nanotube was picked up from the cathode deposit by using the micromanipulator, and was moved onto the surface of the $SiO_2$/Si substrate on which the Au/Cr electrode was formed, and was arranged between the Au electrodes such that both ends of the carbon nanotube was in contact with the electrodes. Thereafter, an electron beam ($4\times10^{-12}$ A) was irradiated onto both ends of the multi-wall carbon nanotube for about 1 minute so as to fix the multi-wall carbon nanotube to the Au electrode.

Figure 7:
FIG. 7 is an SEM photographic image (magnification of 20,000 times) showing the antenna in accordance with an example of the present invention.

The antenna according to this example was fabricated in the above-mentioned manner. FIG. 7 is an SEM photographic image (magnification of 20,000 times) showing the antenna in accordance with this example of the present invention. In FIG. 7, it is found that rectangular shadows that are slightly visible on the upper left and the lower right are the pair of electrodes, and the carbon nanotube is so arranged as to bridge the gap between those electrodes.

(Frequency Characteristic)

Figure 8:
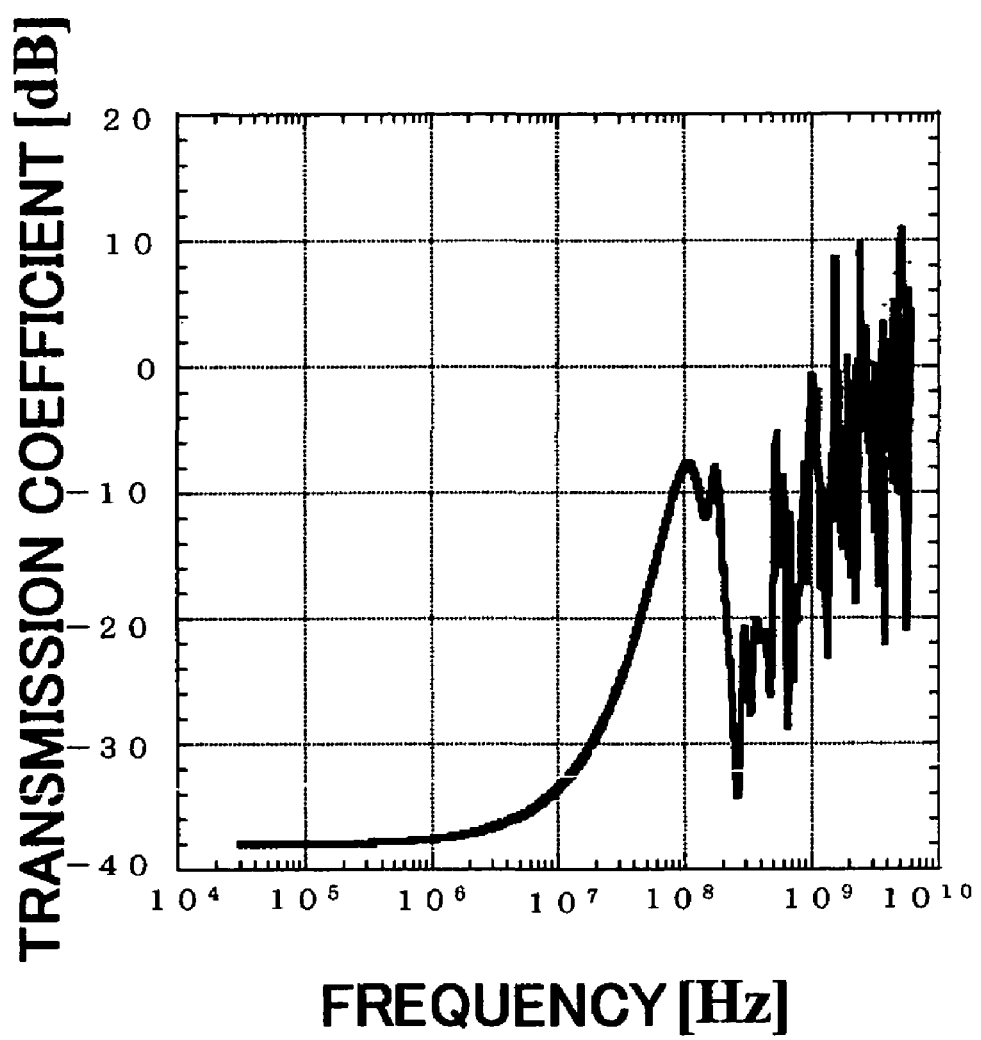
FIG. 8 is a graph showing the transmission coefficient characteristic to the frequency in the antenna shown in FIG. 7 in which the axis of ordinate is a transmission coefficient, and the axis of abscissa is a frequency.

The frequency characteristic of the antenna thus obtained according to the first example was measured. More specifically, the transmission coefficient of the antenna according to the first example was measured by a measurement system made up of a network analyzer (8753ES, manufactured by Agilent Technologies) and a coaxial air line. After the measurement system was corrected, the antenna according to the first example was inserted into the coaxial air line, and the frequency characteristic was measured by using two ports. The measurement frequency was 30 kHz to 6 GHz. FIG. 8 is a graph showing the transmission coefficient characteristic to the frequency in the antenna according to the first example. It is found from the graph that in the antenna according to the first example, its transmittance rises from about $10^6$ Hz, and the transmission coefficient is hardly attenuated even if the frequency is $6\times10^9$ Hz.

(Electromotive Force)

Figure 9:
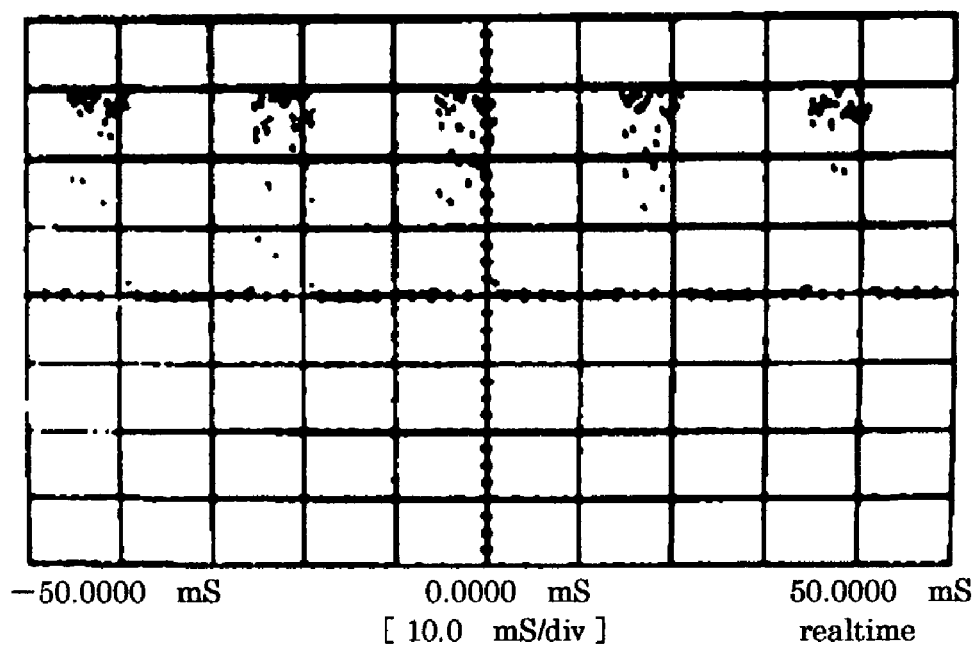
FIG. 9 is an image obtained by subjecting a screen of an oscilloscope that monitors an electromotive force when the antenna shown in FIG. 7 is irradiated with an electromagnetic wave, to image processing.
Figure 10:
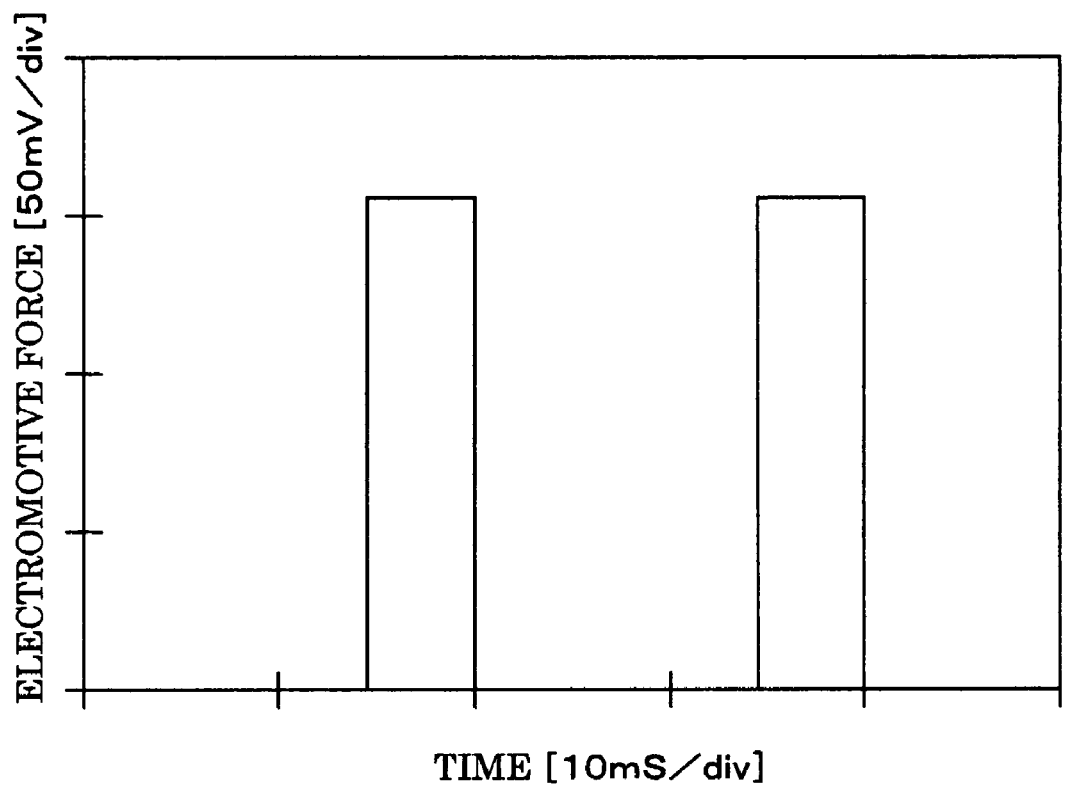
FIG. 10 is a graph schematically showing the image on a screen of the oscilloscope shown in FIG. 9.

The electromotive force induced when the electromagnetic wave of 800 MHz was irradiated onto the antenna according to the first example was measured. It was assumed that the transmission output of an oscillator was 800 mW, and a distance between the transmission antenna of the oscillator and the antenna of the first example was 20 mm. An induced electric power was monitored by an oscilloscope, and the electromotive force of about 150 mV was developed in this example in which the multi-wall carbon nanotube was used. FIG. 9 is an image obtained by subjecting the screen of the oscilloscope at this time to image processing as it is, and FIG. 10 is a graph schematically showing the image. In the following example and comparative examples, only graphs schematically showing the image as required are attached.

An antenna was fabricated by using another multi-wall carbon nanotube in the above-mentioned manner, and an experiment was conducted in the same manner. Then, the electromotive force at that time was about 200 mV.

Second Example (Fabrication of Antenna)

A pair of Au/Cr electrodes were fabricated on an $SiO_2$ layer side surface of the $SiO_2$/Si substrate with a gap of 10 μm therebetween as in the first example. The thickness of the electrodes was 50 nm.

The single-wall carbon nanotube composed through the arc electric discharge method was purified (about 1 nm in the mean diameter), and dispersed in dimethylformamide at the ratio of 10 g/l. One droplet of the single-wall carbon nanotube was dropped in the gap between the pair of electrodes by using a micropipette and was then naturally dried.

Figure 11:
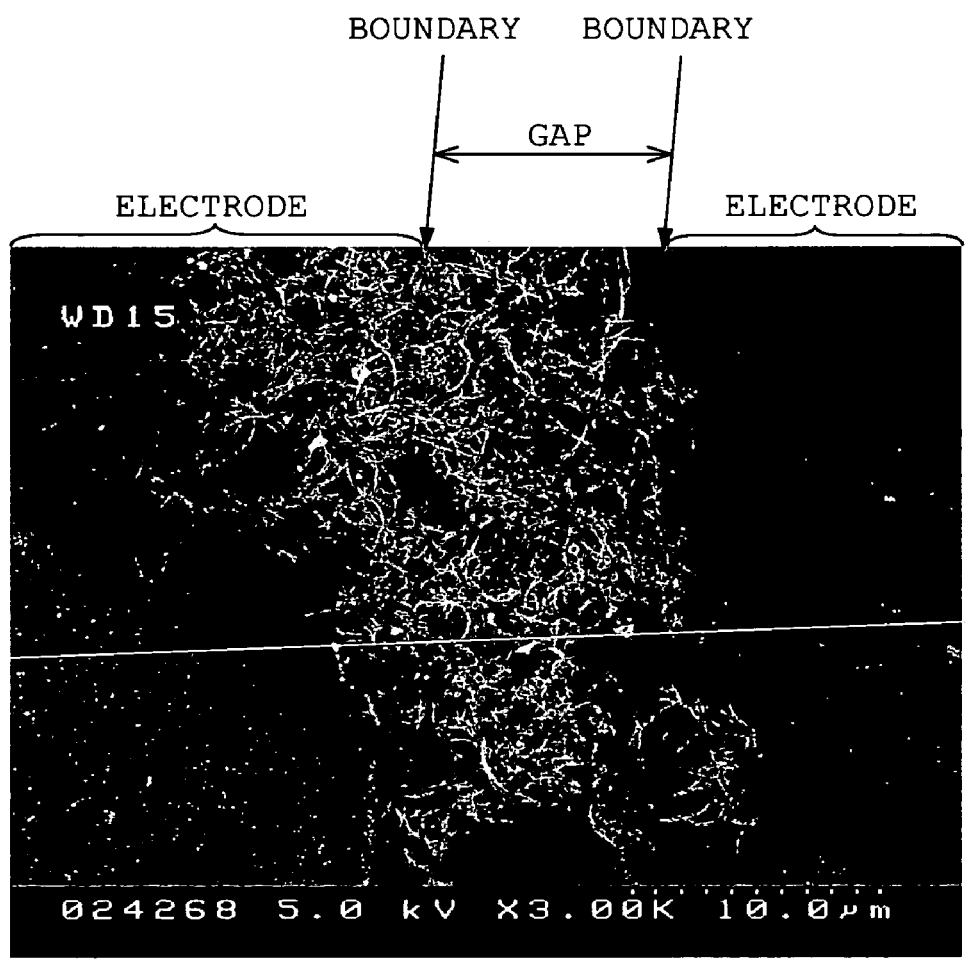
FIG. 11 is an SEM photographic image (magnification of 3000 times) obtained by extracting only a portion at which a carbon nanotube is located and enlarging the extracted portion in the antenna in accordance with an example of the present invention.

The antenna of this example was fabricated in the above-manner. FIG. 11 is an SEM photographic image (magnification of 3000 times) obtained by extracting only a portion at which a carbon nanotube is located and enlarging the extracted portion in the antenna in accordance with this example of the present invention. In FIG. 11, the single-wall carbon nanotubes seem to be white thin lines, and it is found that plural single-wall carbon nanotubes are so arranged intricately as to bridge a gap between the electrodes.

(Electromotive Force)

Figure 12:
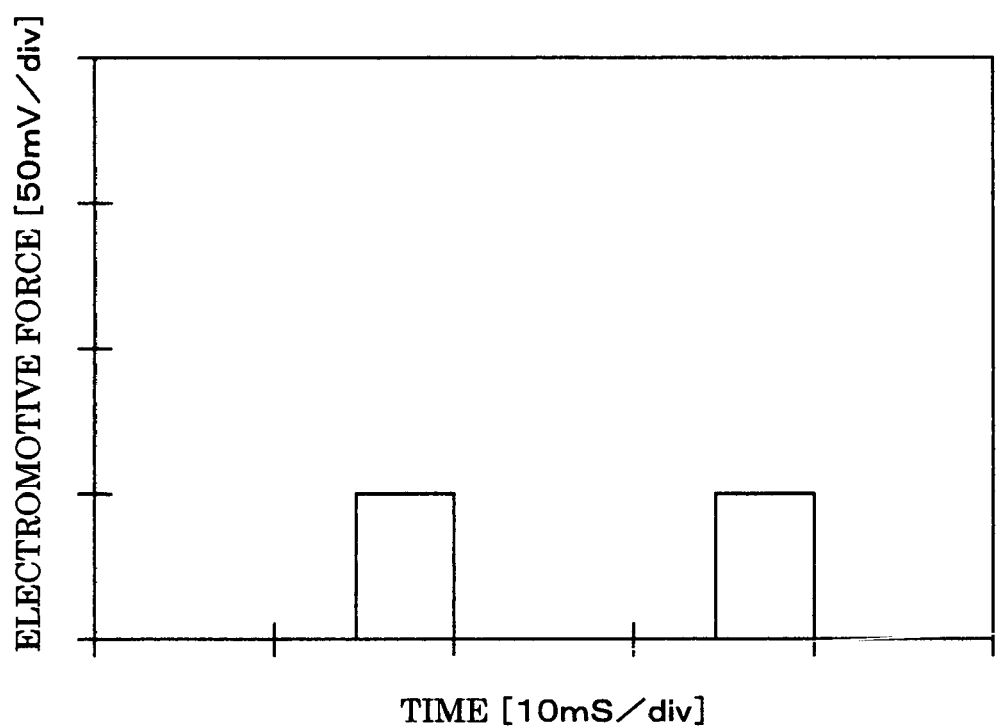
FIG. 12 is a graph schematically showing an image on the screen of an oscilloscope that monitors an electromotive force when the antenna shown in FIG. 11 is irradiated with an electromagnetic wave.

The electromotive force of the antenna according to the second example was measured in the same manner as that in the first example. The electromotive force of about 50 mV was developed in the antenna using the single-wall carbon nanotube according to this example. FIG. 12 is a graph schematically showing an image on the screen of the oscilloscope at that time.

Because the single-wall carbon nanotube is microscopic, it is difficult to connect the single-wall carbon nanotube to the electrode, individually, and the connection resistance to the electrode is liable to rise. Also, since the single-wall carbon nanotube is structured by only one wall, it is estimated that the sensitivity is lowered as compared with the multi-wall carbon nanotube.

First Comparative Example

As a comparative measurement, an antenna made of high orientation graphite was used as the antenna of a first comparative example. The antenna has been conventionally used as the antenna of the general communication device. The high-orientation graphite has graphite oriented in a C-axial direction, and its size is 10 mm in length, 10 mm in width and 2 mm in thickness.

Figure 13:
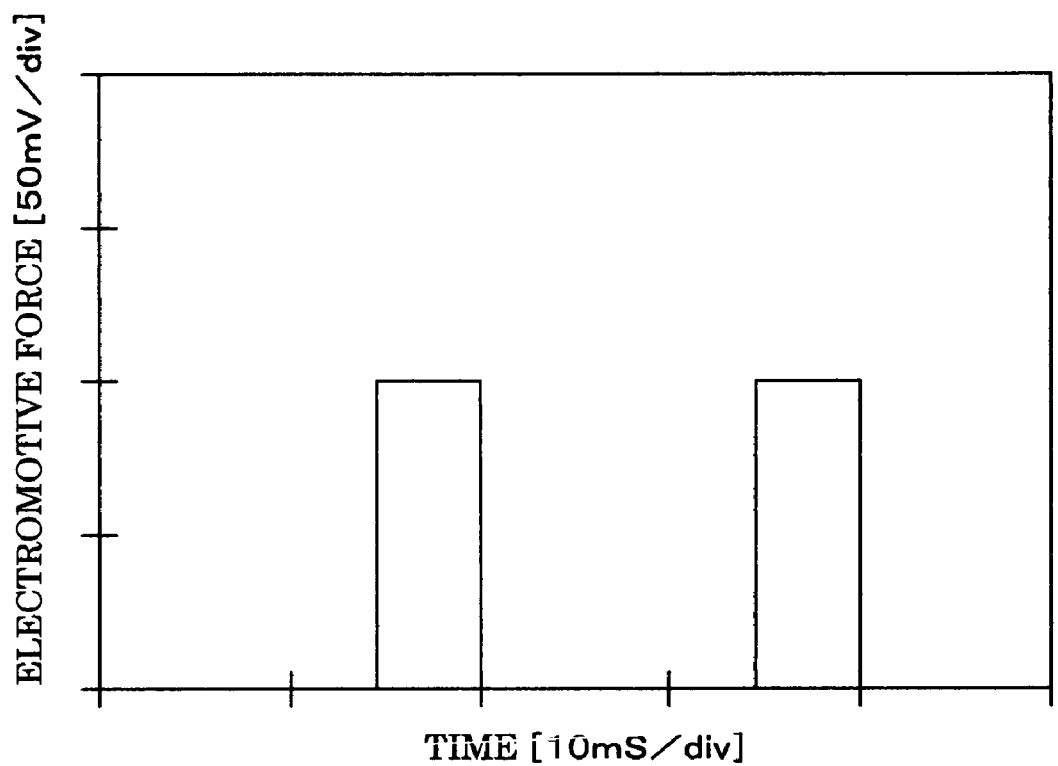
FIG. 13 is a graph schematically showing an image on the screen of an oscilloscope that monitors an electromotive force when an antenna of a comparative example using a high-orientation graphite is irradiated with an electromagnetic wave.

In the antenna according to the first comparative example, the electromotive force was measured in the same manner as that in the first example. The electromotive force of about 100 mV was developed in the antenna of the first comparative example, using the high-orientation graphite. FIG. 13 is a graph schematically showing the screen of the oscilloscope at that time.

Second Comparative Example

As a comparative measurement, an antenna obtained in the same manner as in the first example until the formation of the electrode, on which the carbon nanotube was not disposed, was used as an antenna according the second comparative example.

In the antenna of the second comparative example, the electromotive force was measured in the same manner as that in the first example, but the electromotive force was not observed.

(Consideration of the Results)

Taking the above into consideration, in the antenna according to the present invention in which the carbon nanotube is the primary structural element, it is apparent that the sufficient electromotive force is developed by the electromagnetic wave, although the antenna is microscopic, and it is confirmed that the carbon nanotube functions as an antenna. On the contrary, in the first comparative example which is the general antenna, although the sufficient electromotive force is developed, the size of the antenna per se is extremely large, and the downsizing of the communication device having the above antenna is obstructed. Also, in the second comparative example where no carbon nanotube is disposed, the electromotive force is not developed, and it is confirmed that the electrode as a single unit does not function as an antenna.

INDUSTRIAL APPLICABILITY OF THE INVENTION

According to the present invention, it is possible to provide an antenna of nano order which is excellent in the response characteristic in the high-frequency band, and the further high performance and downsizing of the antenna in the communication field are effectively large, and the industrial usefulness is remarkably high.

Also, there can be provided a communication device that is provided with an antenna having the above-mentioned excellent characteristic and being capable of realizing downsizing.

The invention claimed is:

1. An antenna characterized by comprising:
    a radiator formed of a carbon nanotube,
    an electrode that is connected with a part of the carbon nanotube and is for operating the antenna as a monopole antenna.

2. The antenna as claimed in claim 1, characterized in that the carbon nanotube connected to the electrode is disposed in plurality.

3. The antenna as claimed in claim 1, characterized in that at least a part of the carbon nanotube which is not connected to the electrode is fixed to another member.

4. The antenna as claimed in claim 1, characterized in that the electrode contains any one of materials selected from the group consisting of Au, Pt, Ag, Cu, Ta, Nb and Ti.

5. The antenna as claimed in claim 1, characterized in that a connection resistance between the carbon nanotube and the electrode connected with the carbon nanotube is set to 10 MΩ or lower.

6. The antenna as claimed in claim 1, characterized in that the electrode is disposed on a surface of a substrate.

7. The antenna as claimed in claim 6, characterized in that a resistivity of the surface of the substrate on which the electrode is disposed is $1 \times 10^6$ Ωcm or more.

8. The antenna as claimed in claim 6, characterized in that a dielectric layer is formed on an uppermost surface of the substrate on which the electrode is disposed.

9. The antenna as claimed in claim 8, characterized in that a thickness of the dielectric layer is set to 1 nm to 10 mm.

10. The antenna as claimed in claim 1, wherein the electrode is connected with one end portion or a periphery of the carbon nanotube.

11. The antenna as claimed in claim 10, characterized in that the carbon nanotube connected to the electrode is disposed in plurality.

12. The antenna as claimed in claim 10, characterized in that the electrode contains any one of materials selected from the group consisting of Au, Pt, Ag, Cu, Ta, Nb and Ti.

13. The antenna as claimed in claim 10, characterized in that a connection resistance between the carbon nanotube and the electrode connected with the carbon nanotube is set to 10 MΩ or lower.

14. The antenna as claimed in claim 10, characterized in that the electrode is disposed on a surface of a substrate.

15. The antenna as claimed in claim 14, characterized in that a resistivity of the surface of the substrate on which the electrode is disposed is set to $1 \times 10^6$ Ωcm or more.

16. The antenna as claimed in claim 14, characterized in that a dielectric layer is formed on an uppermost surface of the substrate on which the electrode is disposed.

17. The antenna as claimed in claim 16, characterized in that a thickness of the dielectric layer is set to 1 nm to 10 mm.

18. The antenna as claimed in claim 1, characterized in that the carbon nanotube comprises a multi-wall carbon nanotube.

19. The antenna as claimed in claim 1, characterized in that a diameter of the carbon nanotube is set to 0.3 nm to 100 nm.

20. The antenna as claimed in claim 1, characterized in that a length of the carbon nanotube is set to 0.1 μm to 100 μm.

21. The antenna as claimed in claim 1, characterized in that at least a part of the carbon nanotube is covered with a protective layer.

22. The antenna as claimed in claim 21, characterized in that the protective layer comprises a dielectric.

23. The antenna as claimed in claim 1, characterized in that a transmission band and/or a reception band is set to 500 MHz to 1 THz.

24. The antenna as claimed in claim 1, characterized in that the antenna functions as a transmission antenna.

25. A communication device having a transmitting function characterized by comprising the antenna as claimed in claim 24.

26. The antenna as claimed in claim 1, characterized in that the antenna functions as a reception antenna.

27. A communication device having a receiving function characterized by comprising the antenna as claimed in claim 26.

28. The antenna as claimed in claim 1, characterized in that the antenna functions as a transmission and reception antenna.

29. A communication device having a transmitting/receiving function characterized by comprising the antenna as claimed in claim 28.

30. The communication device as claimed in claim 29, characterized by further comprising a transmitting circuit, a receiving circuit, and a duplexer that changes over a circuit to be connected with the electrode of the antenna between the receiving circuit and the transmitting circuit.

31. A communication device having a transmitting/receiving function characterized by comprising a transmitting circuit, a receiving circuit, and the antenna as claimed in claim 1 which is selectively connected to at least one of the transmitting circuit and the receiving circuit.

* * * * *